United States Patent
Altius (10) Patent No.: US 8,630,934 B2
(45) Date of Patent: Jan. 14, 2014

(54) SYSTEM AND METHOD FOR MONITORING TRADING

(75) Inventor: Goran Altius, Vallentuna (SE)

(73) Assignee: OMX Technology AB, Stockholm (SE)

( * ) Notice: Subject to any disclaimer, the term of this patent is extended or adjusted under 35 U.S.C. 154(b) by 1844 days.

(21) Appl. No.: 11/455,935

(22) Filed: Jun. 20, 2006

(65) Prior Publication Data

US 2008/0015966 A1    Jan. 17, 2008

(51) Int. Cl.
*G11C 8/12* (2006.01)
*G06F 12/08* (2006.01)
*G06Q 40/00* (2012.01)
*G06Q 40/04* (2012.01)

(52) U.S. Cl.
CPC ........ *G06F 12/0804* (2013.01); *G06F 12/0866* (2013.01); *G11C 8/12* (2013.01); *G06Q 40/00* (2013.01); *G06Q 40/04* (2013.01)
USPC ......... 705/36 R; 711/103; 711/173; 711/101; 705/37

(58) Field of Classification Search
None
See application file for complete search history.

(56) References Cited

U.S. PATENT DOCUMENTS

| | | | | |
|---|---|---|---|---|
| 4,674,044 | A * | 6/1987 | Kalmus et al. | 705/37 |
| 5,920,833 | A * | 7/1999 | Dierke | 704/230 |
| 5,920,883 | A * | 7/1999 | Tamaki et al. | 711/101 |
| 6,618,707 | B1 | 9/2003 | Gary | |
| 6,643,755 | B2 * | 11/2003 | Goodhue et al. | 711/173 |
| 6,799,264 | B2 * | 9/2004 | Goodhue et al. | 712/207 |
| 7,246,093 | B1 * | 7/2007 | Katz | 705/37 |
| 2002/0174056 | A1 * | 11/2002 | Sefein et al. | 705/37 |
| 2003/0004686 | A1 * | 1/2003 | Ueno et al. | 702/188 |
| 2003/0130925 | A1 | 7/2003 | Malitzis | |
| 2003/0200167 | A1 * | 10/2003 | Kemp et al. | 705/37 |
| 2003/0236737 | A1 * | 12/2003 | Kemp et al. | 705/37 |
| 2004/0133506 | A1 * | 7/2004 | Glodjo et al. | 705/37 |
| 2004/0199452 | A1 * | 10/2004 | Johnston et al. | 705/37 |
| 2004/0210578 | A1 * | 10/2004 | Taitel | 707/8 |
| 2005/0094667 | A1 * | 5/2005 | Dahlman et al. | 370/473 |
| 2005/0114337 | A1 * | 5/2005 | Lunteren | 707/9 |
| 2005/0228735 | A1 * | 10/2005 | Duquette | 705/37 |
| 2005/0251617 | A1 * | 11/2005 | Sinclair et al. | 711/103 |
| 2005/0283421 | A1 * | 12/2005 | Hatheway et al. | 705/37 |
| 2005/0288903 | A1 * | 12/2005 | Jackson et al. | 702/187 |
| 2005/0289062 | A1 | 12/2005 | Hori et al. | |

(Continued)

FOREIGN PATENT DOCUMENTS

CN    1672137 A    9/2005
JP    10098441 A  *  4/1998

OTHER PUBLICATIONS

Automobile Electrical and Electronic Systems 3rd addition by Tom Denton; 476 pages; 2004.*

(Continued)

*Primary Examiner* — Ella Colbert
*Assistant Examiner* — Mary Gregg
(74) *Attorney, Agent, or Firm* — Nixon & Vanderhye P.C.

(57) ABSTRACT

A monitoring system for monitoring trade at an electronic exchange comprises memories related to a specific time interval. A trade occurring during that time interval or a parameter value related to the trade is recorded to a memory related to the time interval. At a point in time, a recent trade parameter is determined based on the accumulated trade parameter values in the memories. Based on the recent trade parameter and some rules and operators, one or more monitoring actions is executed.

31 Claims, 9 Drawing Sheets

(56) References Cited

U.S. PATENT DOCUMENTS

| | | | |
|---|---|---|---|
| 2006/0018179 A1* | 1/2006 | Marchal et al. | 365/230.03 |
| 2006/0020536 A1 | 1/2006 | Renton et al. | |
| 2006/0059238 A1* | 3/2006 | Slater et al. | 709/206 |
| 2006/0129470 A1* | 6/2006 | Brendgen | 705/35 |

OTHER PUBLICATIONS

Securities and Exchange Commission form 19b-4, *Proposed Rule Change by Boston Stock Exchange Pursuant to Rule 19b-4 under the Securities Exchange Act of 1934*, dated Nov. 24, 2004, 10 pages.

ORC, *An Industry Report; Looking at the real impact of electronic execution on trading behavior in the financial markets; The dawn of a new era or over-hyped propaganda?*, cover page and pp. 2-21.

CME, *CME® iLink 2.X Certification Guide for Market Maker Functionality*, Document Version 1.0, Document Release Date: Sep. 12, 2005, front and back cover with pp. 2-18.

Topping, *Market Makers Seek Protection from Exchanges*, FOWEEK, Jul. 12, 2004, 1 page.

Eurex Xpand, Newsletter 81/August, Sep. 2005, 23 pages.

Securities and Exchange Commission, Release No. 34-50814; File No. SR-BSE-2004-52, Dec. 7, 2004, *Self-Regulatory Organizations; Boston Stock Exchange, Inc.; Notice of Filing of Proposed Rule Change and Amendment No. 1 Thereto Relating to Market Maker Quote Obligations Under the Rules of the Boston Options Exchange Facility*, 12 pages.

Eurex Release 8.0, *Set the Sails, Enjoy more Freedom in Trading!*, Oct. 2005, 2 pages.

Australian Search Report and Written Opinion mailed Jun. 29, 2009 in corresponding Singapore Patent Application No. 200809034-2.

English Translation of Chinese official action, Mar. 6, 2012, in corresponding Chinese Application No. 200780022864.1.

\* cited by examiner

Example of serie for option

| Underlying | Ericsson |
| Strike price | 35 Sek |
| Maturity date | May |
| Buy/sell | buy |

Fig. 19

SYSTEM AND METHOD FOR MONITORING TRADING

TECHNICAL FIELD

The present invention relates to a system and method for management and monitoring of trading in an electronic exchange.

BACKGROUND

Electronic exchange systems of today can generate high trading volumes during short time intervals, creating very fast moving markets. In these fast moving markets when many participants want to trade at the same time, and/or prices change quickly, delays in traffic often occur. Because of the high concentration of participants and the high rate of messages in such systems, trade executions and confirmations slow down, and reports of prices lag behind actual prices. Thus, response times for orders and quotes increase, and the immediate risk is that market participants can experience unexpected losses very quickly. Hence, participants active in the market put themselves and/or their clients in risky situations. Market makers, in particular, may expose themselves to very high risks due to their special role in the market.

A market maker may be a person or a firm which quotes in securities such as financial instrument or commodities, thus providing liquidity to the market and in return for this may be granted some advantages. The special situation for a market maker is described below.

In this document the definition of securities is taken from the official definition of securities, from the Securities Exchange Act of 1934, and is as follows: "Any note, stock, treasury stock, bond, debenture, certificate of interest or participation in any profit-sharing agreement or in any oil, gas, or other mineral royalty or lease, any collateral trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase, any of the foregoing." Furthermore in this document, a security also includes currency or any note, draft, bill of exchange, or banker's acceptance.

Market makers have a special position since they often provide liquidity and take risk in the market. In order to provide liquidity to the market, they provide quotes in multiple securities and may take positions in a lot of securities during a short time interval. If during such a situation multiple quotes are matched and traded, the risk curve for the market maker could rapidly and dramatically change, thereby exposing the market maker to more risk than expected. Thus the price exposure in the electronic exchange may create a risk to the market makers since they can quickly accumulate a large risk position before they can delete/change their existing orders. This type of price exposure is known as in-flight fill risk.

Therefore there is a need for systems that prevents, e.g., market makers, from being exposed to the in-flight fill risk, thus reducing the risk for unwanted and rapid changes of the risk curve.

There exist systems that provide simple approaches to reduce high-unexpected speed of trading. Usually these systems include a monitoring system located at the client site. However these approaches are not effective because of the speed of the electronic exchange systems today. A monitoring system at a client may take a few seconds or up to as much as 10 seconds before it reacts and can stop the orders sent from a participant from being matched. During this period, many thousands of orders could be matched and traded at the electronic exchange system. As a result, electronic exchange systems have developed simple monitoring systems that monitor the speed of trading per participant or per trader at the exchange. If the speed of trading exceeds a predetermined limit, the exchange system automatically triggers actions to protect this participant or user from further exposure in the market.

One such system is described in US patent application US2004/0199452 which discloses a method and system that allow traders to protect against in-flight risks using order risk data provided by traders. The order risk data includes order risk parameters, such as delta, gamma and/or vega. Delta is a measure of the rate of change in an option's theoretical value for a one-unit change in the price of the option's underlying contract. Thus, delta is the theoretical amount by which the option price can be expected to change for a change in the price of the underlying contract. As such, delta provides a local measure of the equivalent position risk of an option position with respect to a position in the underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the volatility of the underlying contract. Delta, gamma, and vega are the primary risk management measures used by those who trade in options.

However, another risk management measure for evaluating in-flight fill risk is to keep track of the trade volume especially recent trading volume. Recent trading volume is the number of traded instruments during a time interval.

Today, the recent trading volume count is calculated by continuously adding, for example the volume from each individual matched trade, and keep track of each trade's volume and its timestamp, and then continuously subtract volume of trades outside the scope of the measured time interval.

Thus, each individual trade needs to be maintained as long as it is included in the recent trading volume count. Keeping track of high numbers of trades, time stamps etc. utilize system resources.

Furthermore, evaluating which trades' volume should be removed from the recent trading count, and updating the count and the trade collection, also utilities additional system resources, these calculations are very processor demanding, and therefore use processor time that could be used for executing other tasks.

Hence there is a need for an improved system and method for monitoring trading at electronic exchanges, and thereby decreasing risk exposure for participant at the exchange and at the same time performing the task in the most efficient way in order to save system resources such as processor time and memory utilization.

SUMMARY

Thus it is an object to provide at least a partial solution to some of the problems mentioned above.

It is further an object to provide a solution that saves capacity usage of a processor.

It is further an object to provide a solution that saves system resources.

It is further an object to provide a solution that saves memory space.

It is further an object to provide a solution that minimizes risk exposure for participants on a market.

It is further an object to provide a solution that minimizes risk exposure for market makers.

It is further an object to provide a solution that reacts fast in reply to movements on an electronic exchange.

According to a first aspect, the above and other objects are achieved by a computer system for monitoring matching of orders between participants, the matching of orders being communicated in trade messages, the trade messages comprising trade parameter data, the computer system comprising:

an interface for receiving trade messages,
an extractor associated with the interface for, upon receiving a trade message, extracting a trade parameter value based on the trade parameter data of the trade message,
a number of memories,
a write unit associated with the memories and the extractor for sequentially addressing the memories for accumulating extracted trade parameter values during a start time and a stop time for each memory,
a read unit associated with the memories for reading accumulated trade parameter values from the memories, and
a determiner associated with the read unit for determining a recent trade parameter by utilizing the accumulated trade parameter value(s) read from the memories. The above computer system has the advantage that it provides a solution that monitors orders in a more efficient way since it does not need to keep track of individual trades. This results in less utilization of system resources. For example the system preferably does not have to keep track of when a trade occurred since each trade parameter value will be stored in a time interval. Thereby there is less data that has to be processed in the computer system. Thus less system resources are used such as processor time and storage space.

Trade parameter data may be any data that is related to a trade such as quantity, security, time, order number, participant, trader and so forth.

Trade parameter value is preferably a value that has been extracted from the trade parameter data in the trade message. It can for example be: Volume of trade, a Vega value, a delta value, a theta value and gamma value. These values have already been described above. Furthermore the above trade parameter values may also be values per counter party, for example a trader A may obtain an unwanted risk position against trader B because B's credit worthiness is not large enough.

Recent trade parameter is the accumulated trade parameter values from one or more of the memories. When the recent trade parameter is determined a delta change of the trade parameter values may preferably be used. In this way the update of the recent trade parameter is more efficient since the delta change describes the change that has occurred. Thus there is no need to determine the recent trade parameter by aggregating the accumulated trade parameter values from each memory.

Furthermore the computer system may comprise a write unit that addresses one memory at a time.

Preferably the computer system comprises a write unit that cyclically and sequentially addresses one memory at a time.

According to a first aspect the above and other objects are achieved by a computer system for monitoring matching of orders between participants, the matching of orders being communicated in trade messages, the trade messages comprising trade parameter data, the computer system comprising:

a first memory being accessible for storing from a first start time to a first end time,
a second memory being accessible for storing from a second start time to a second end time, the second start time occurring later than the first start time and the second end time occurring later than the first end time,
an interface for receiving the trade messages,
the computer system being programmed to:
upon receiving a trade message via the interface, determine a trade parameter value based on the trade parameter data in the trade message,
adding the trade parameter value to any accessible memory, thereby creating an accumulated trade parameter value, and
determining a recent trade parameter by utilizing the accumulated trade parameter value from at least one of the first memory and second memory,
thereby monitoring matching of orders.

The computer system may further being programmed to:
upon a first trade message in a time interval overwrite an old accumulated trade parameter value in the memory by adding the trade parameter value,
sequentially adding the trade parameter value to the memory being accessible.

Thus, the computer system preferably stores a trade parameter value in each memory during the time interval wherein the memory is activated, and thereby creates an accumulated trade parameter value in each memory. Upon a trade or upon a predetermined or arbitrary point in time, or after a certain time period, or at regular intervals, the system accumulates the accumulated trade parameter values from each memory in order to determine a recent trade parameter. Preferably the recent trade parameter value is updated by the delta-change that has occurred in a memory. The recent trade parameter can thereafter be used for monitoring matching of trades by comparing it to a threshold value or process it in any other way suitable for the context wherein the invention is being used. For example for protecting participants from in-flight fill risk, preventing panic movements in the market and so forth.

By overwriting the old accumulated trade parameter value when accessing a memory, system resources can be saved since the system preferably does not have to perform a delete step. However the accumulated trade parameter value is only overwritten the first time a memory is accessed in a time interval; thereafter the accumulated trade parameter value is accumulated by adding the new trade parameter value from a recent match that has occurred in the electronic exchange. The adding step continues until the time interval ends and the memory is no longer active. When the first memory is no longer accessible the second memory becomes accessible and the steps are repeated for the second memory. Since the memories may be used in a loop as will be described later, the above described steps are repeated when the memory becomes active again.

In another embodiment the computer system may comprise an evaluator, the evaluator being programmed to:
by use of an operator, evaluate the recent trade parameter in view of a threshold value, and
if the recent trading parameter fulfills a criteria based on the evaluation, execute a monitoring action.

The evaluator is for evaluating the recent trade parameter, for example if it fulfills or exceeds certain criteria, thresholds or other rules. Based on the outcome the evaluator may execute a monitoring action.

The criteria, thresholds or rules may be individually decided for each participant or for a group of participants and implemented by operators or rules which may further be decided based on the relevant participant/participants special situation such as financial strength, trust and so forth. Furthermore the participant himself may decide own threshold values and rules.

The operator may be any type of operator that is suitable for the context wherein the present invention is used, for example relational operators such as (=, ≤, <, >, ≥, ≠ etc.) or boolean operators such as (AND, OR, XOR, NOR, NAND and NOT) or any combination of these.

The monitoring action may be chosen from a group of actions, the group comprising:
  notification action, this may be to notify a participant or the electronic exchange that something has occurred,
  widening action, this may be to increase (spreading) the spread and/or reduce the volume of an order, making the order less attractive and so forth, and
  canceling action, the canceling action is preferably executed by either deleting the orders or by inactivating the orders. Inactivating an order can be done either by freezing the order or by hiding the order.

Thus, if the criteria or threshold for a recent trade parameter in the system is fulfilled or exceeded the system may execute a so called monitoring action. This action may be based on an adjustment between the electronic exchanges demand on liquidity on one hand, and between a market makers risk exposure on the other hand. Therefore there is a plurality of different actions that can be used based on what a participant want to achieve. The monitoring actions can be divided into the three types of monitoring actions as mentioned above.

A further embodiment employs a plurality of threshold values with the computer system further being programmed to perform a specific monitoring action when the recent trading parameter exceeds each threshold value.

For example when the first threshold value is passed a notification may be sent to the participant. Thereafter when the second threshold value is passed an action making the orders less attractive is executed. Finally when the third threshold value is passed the order may be canceled. Preferably the action of canceling matching of orders concerns orders related to a specific participant. This may be any participant but preferably this system is for monitoring the matching of orders for market makers. The system may also be configured for monitoring matching of orders for a group of participants.

In a further embodiment the computer system may be programmed to accumulate a recent trade parameter from an individual or group of securities, for an individual or a group of participants. Thus the system can be used as an emergency brake for a whole market if the market panics, for example when automatic systems or traders in an uncontrolled way act on their own violation, due to some political or economical happening.

Furthermore the recent trade parameter may be a combination of trade parameter values extracted both from options, stocks and or any type of security according to the definition of securities above.

When the system changes from the first memory to the second memory preferably the second start time occurs simultaneously with the first end time. Either the second start time starts after the first end time so that a trade parameter value would not be recorded in both intervals. However there may also be situations where the second start time starts at the same time as the first end time ends. In this case a trade parameter value would be recorded in both the first and second interval and thus be added to both the first and second memory. This would result in that the trade is added twice to the recent trade parameter. One reason for choosing this solution may be to decrease the risk even more for a participant. There may also be situations when the second start time starts before the first end time ends.

Any of the above example embodiments can preferably be implemented and it is up to each participant or central exchange to choose which example embodiments best suitable for their situation.

The length of the time intervals may be variable. For the first memory the time between the first start time and first end time is preferably less than 30 seconds. Such as 20 seconds, 15 seconds, 10 seconds 7 seconds, 5 seconds, 4 seconds, 3 seconds, 2 seconds, 1 second, 0.5 second, 0.1 second or even shorter time intervals.

This is also applicable for second time interval, the time between the second start time and second end time, is preferably less than 30 seconds. Such as 20 seconds, 15 seconds, 10 seconds 7 seconds, 5 seconds, 4 seconds, 3 seconds, 2 seconds, 1 second, 0.5 second, 0.1 second.

Preferably the first time interval and second time interval may have the same time between the start time and end time. However there exist situations when the time, for the time intervals, is different. One such situation may be during periods with high trading activity the time intervals may be shorter in order to obtain a more detailed picture of the situation.

In another embodiment there exists a plurality of time intervals such as 3, 4, 5, 6, 7, 8, 9 or 10 time intervals. Each interval is associated with a specific memory that is activated during the time interval. When there are a plurality of memories associated with a plurality time intervals the time intervals are shorter, such as 0.1, 1, 2, 3, 4, or 5 seconds.

Thus the system may comprise 2 to n memories, each memory being accessible for storing from a start time and an end time, wherein the n:th start time occurs after the (n−1)th start time and n:th end time ends after (n−1)th end time.

The memories do not have to be physically separated memories. Preferably it is memory allocations in the same memory. Depending on which memory that is used, different access speed is obtained. Preferably RAM memory is used; however other memories may be used such as: cache memory, hard disk memories, removable memories such as a memorystick or the alike.

The configuration of the computer system relating to how many time intervals and associated memories to use depend on the context wherein the technology will be implemented. It may be dependent on the delay time between a client computer and a central computer comprising the electronic exchange wherein the matching occurs. Usually the delay is less than a couple of seconds, however since computer systems are becoming faster this delay may decrease and the configuration may have to change in order to meet future demands. However the technology executes monitoring actions that prevent trades from occurring that are outside a participants control due to data latency in the system.

The trade parameter value which is determined in the system may be chosen from a group of parameters, the group comprising:

Volume,
Vega parameter,
Delta parameter, and
Gamma parameter.

This is not an exhaustive list of parameters. Other parameters not mentioned herein and known to the person skilled in the art may also be used.

Order risk data may thus include maximum delta, gamma or vega utilization values for derivative products.

As mentioned earlier the participant may be different types of entities. Preferably the participant may be chosen from a group of members, the group comprising:
  a market maker, the market maker can be both an individual (person) or a company,
  a company,
  an individual,
  a combination of the above.

The computer system described above may preferably be implemented in a central computer such as in a central computer for an electronic exchange; however it may also be implemented in a network device, such as a router, switch, gateway or other electronic device suitable for hosting the task.

According to a third aspect the above objects and advantages are achieved by providing an electronic exchange comprising:
  a market place comprising an orderbook for keeping a record of orders,
  a matching module for matching of orders,
  a member database,
  an information dissemination module for distributing information to members associated to the electronic exchange, and
  a trade monitoring module for monitoring matching of orders in the electronic exchange,
the matching of orders is communicated in trade messages, the trade messages comprising trade parameter data, the trade monitoring system comprising:
  an interface for receiving trade messages,
  an extractor associated with the interface for, upon receiving a trade message, extracting a trade parameter value based on the trade parameter data of the trade message,
  a number of memories associated with the extractor,
  a write unit associated with the memories for sequentially accessing the memories for accumulating extracted trade parameter values during a start time and a stop time for each memory,
  a read unit associated with the memories for reading accumulated trade parameter values from the memories, and
  a determiner associated with the read unit for determining a recent trade parameter by utilizing the accumulated trade parameter values read from the memories,
thereby monitoring matching of orders.

The above electronic exchange has the advantage that it monitors trades in a more efficient way since it does not need to keep track of individual trades included in a recent trading volume count. This results in less utilization of system resources. For example it preferably does not have to keep track of when the trade occurred since each trade parameter value will be stored within a time interval. Thereby there is less data that has to be processed in the computer system. Thus less system resources is used such as processor time and storage space.

In another embodiment the electronic exchange may comprise a monitoring module comprising:
  a first memory being accessible for storing from a first start time to a first end time,
  a second memory being accessible for storing from a second start time to a second end time, the second start time occurring later than the first start time and the second end time occurring later than the first end time,
  an interface for receiving the trade messages,
the computer system being programmed to:
  upon receiving a trade message via the interface, determine a trade parameter value based on the trade parameter data in the trade message,
  adding the trade parameter value to any accessible memory, thereby creating an accumulated trade parameter value, and
  determining a recent trade parameter by utilizing the accumulated trade parameter value from at least one of the first memory and second memory,
thereby monitoring matching of orders.

According to a fourth aspect the above object and advantages are achieved by providing a method for monitoring matching of orders in an electronic exchange, between different participants, the matching of orders is communicated in trade messages, the trade messages comprising trade parameter data, the exchange comprising:
  a first memory being accessible for storing from a first start time to a first end time,
  a second memory being accessible for storing from a second start time to a second end time, the second start time occurring later than the first start time and the second end time occurring later than the first end time,
  an interface for receiving the trade messages,
the computer system being programmed to:
  upon receiving a trade message via the interface, determine a trade parameter value based on the trade parameter data in the trade message,
  adding the trade parameter value to any accessible memory, thereby creating an accumulated trade parameter value, and
  determining a recent trade parameter by utilizing the accumulated trade parameter value from at least one of the first memory and second memory,
thereby monitoring matching of orders.

The above method has the advantage that it provides a solution that monitors orders in a more efficient way since it does not need to keep track of individual trades included in a recent trading volume count. This results in less utilization of system resources. For example it preferably does not have to keep track of when the trade occurred since each trade parameter value will be stored within a time interval. Thereby there is less data that has to be processed in the computer system. Thus less system resources are used such as processor time and storage space.

In another embodiment the computerized method for monitoring matching of orders between participants in an electronic exchange comprising an interface, a number of memories, the matching of orders being communicated in trade messages, the trade messages comprise trade parameter data, the method comprising the steps of:
  extracting a trade parameter value based on the trade parameter data of the trade message,
  sequentially addressing the memories for accumulating extracted trade parameter values during a start time and a stop time for each memory,
  reading accumulated trade parameter values from the memories, and
  determining a recent trade parameter by utilizing the accumulated trade parameter values read from the memories.

The method may further comprise the step of addressing one memory at a time.

In a further embodiment the computerized method may further comprising the step of cyclically and sequentially addressing one memory at a time.

The method may further be implemented in an electronic exchange, wherein the exchange further comprising an evaluator, the method comprising the steps of:
- by use of an operator, evaluate the recent trade parameter in view of a threshold value, and
- if the recent trading parameter fulfills a criteria based on the evaluation, execute a monitoring action.

By this feature the method provides a solution that makes it possible to evaluate the current situation for a participant or for the whole market trading at the electronic exchange and monitoring actions can be executed in order to minimize risk for a participant or for the whole market.

One way the method may decreases the risk for a participant is to cancel orders and specifically canceling matching of orders related to a specific member, such as a market maker. However the canceling of orders could also be to cancel a specific security for a specific participant, for example a specific option for a market maker, the market maker may still be able to trade in other options. It can also be cancellation of orders for a combination of securities for a participant or a group of participants, even orders for the whole market.

The method further provides to handle trade parameters wherein the trade parameter is chosen from a group of parameters, the group preferably comprising: volume, delta parameter, vega parameter, and gamma parameter. This is not an exhaustive list and other parameters not mentioned here but obvious to the person skilled in the art may also be added to the group.

As stated above the participant may be chosen from a group of participants, the group comprising: a market maker, a company, an individual, a combination of the above.

Again the monitoring action in the method may be chosen from a group of actions, the group comprising the three classes of actions as mentioned earlier: notification action, widening action, canceling action. The canceling action is preferably executed by either deleting the orders or by inactivating the orders.

Another aspect relates to a memory or storage medium having program instructions for carrying out the steps of the method described above. The method is preferably implemented and stored as computer readable program instructions on a memory or storage medium such as a disk, CD, DVD and so forth.

DETAILED DESCRIPTION

Figure 1:
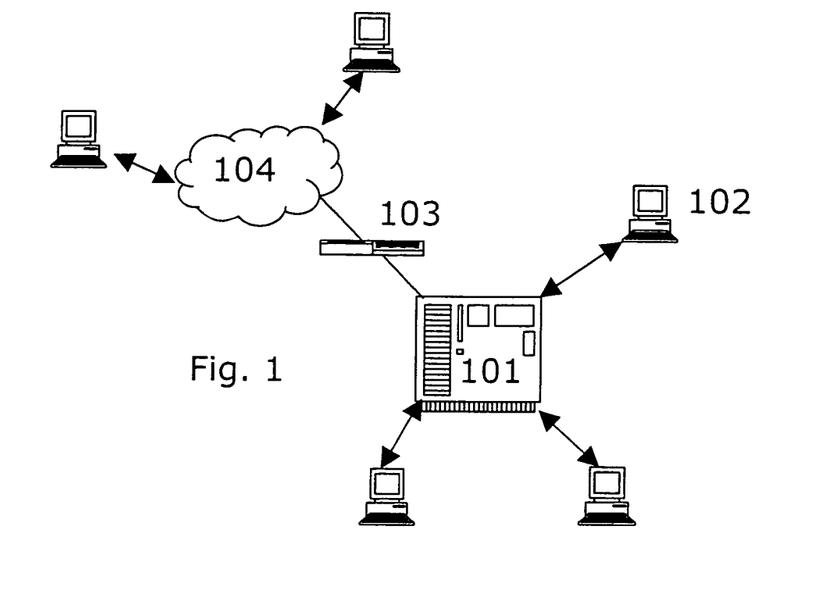
FIG. 1 illustrates an overview of an electronic exchange system wherein the monitoring system may be used.

Non-limiting example embodiments are preferably implemented with computer devices and computer networks that allow participants to send and receive information such as trading information and so forth. An example electronic exchange network environment is shown in FIG. 1. An electronic exchange 101 receives orders from client computers 102, either directly or via network devices 103 and networks 104 such as the Internet or the alike. The client computers may be located at a participant location; the participant may be a trader, a market maker and so forth.

The network device 103 can be routers, bridges, gateways, servers and other devices that can be a node in a network including wireless electronic devices.

Figure 2:
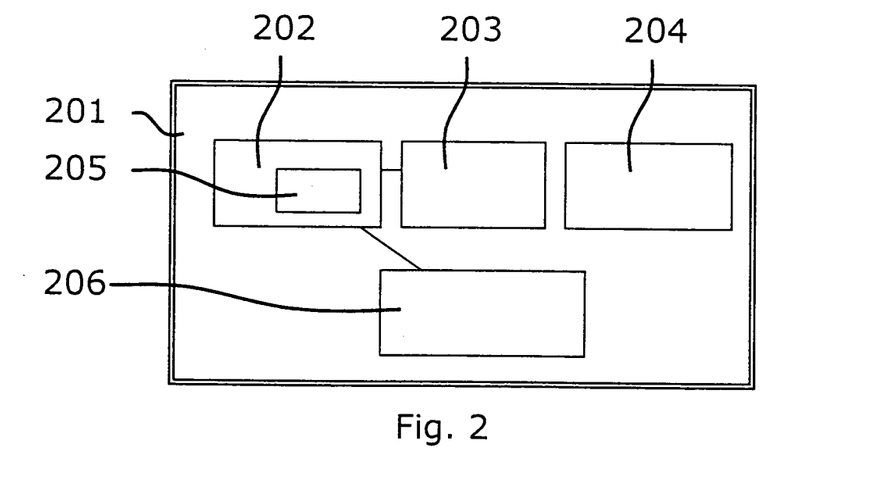
FIG. 2 illustrates a central exchange comprising a monitoring module.

FIG. 2 illustrates a central electronic exchange 201 comprising a matching module 202 wherein matching of bids and offers takes place, an order book 203 wherein the orders not instantly traded may be stored, a participant database 204 comprising information about the participants at the electronic exchange, a deal capture module 206 that keeps track of who has traded what and with whom. The information stored in the database may be data such as name, password, what type of participant such as market maker or normal trader and other data. The electronic exchange may also comprise a monitoring module 205. The modules are implemented by software on hardware devices such as computers comprising a processor and memories. The monitoring module 205 may preferably contain information about a participant's risk level or the monitoring module may at least have access to such data in order to be able to evaluate a recent trade parameter and execute actions. Preferably the monitoring module 205 is integrated in the matching module where it resides and "listens" (monitors) to the data (trade messages) that the matching module sends to the deal capture module 206.

Figure 3:
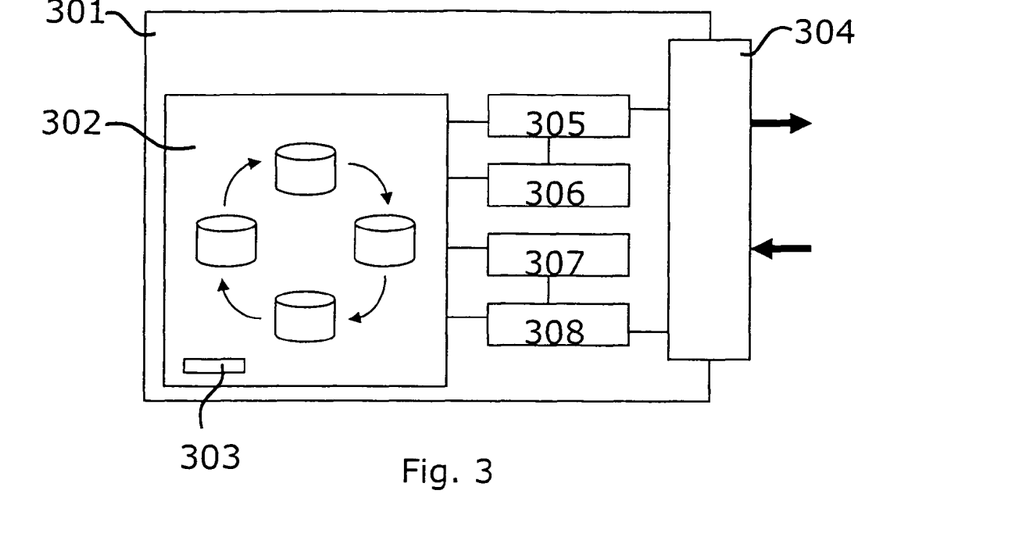
FIG. 3 illustrates an embodiment of a monitoring module.

FIG. 3 shows an example embodiment of a monitoring module 301 comprising an interface 304 for receiving trade messages and sending monitoring action messages, a memory 302 for storing in a number of memories, trade parameter values, an extractor 305 for extracting a trade parameter value based on the trade parameter data of the trade message, a write unit 306 for accumulating extracted trade parameter values during a start time and stop time for each memory, a read unit 307 for reading accumulated trade parameter values from the memories, and a determiner 308 for determining a recent trade parameter 303 by utilizing the accumulated trade parameter values read from the memories. The memory thus, further comprises a recent trade parameter (RTP) 303. The number of memories may be memory allocations in the same physical memory. Furthermore one system may comprise one monitoring module 301 which further may comprise many memories 302 or a system may comprise many monitoring modules 310 that monitor different securities or groupings of derivative securities having the same underlying security.

Figure 4:
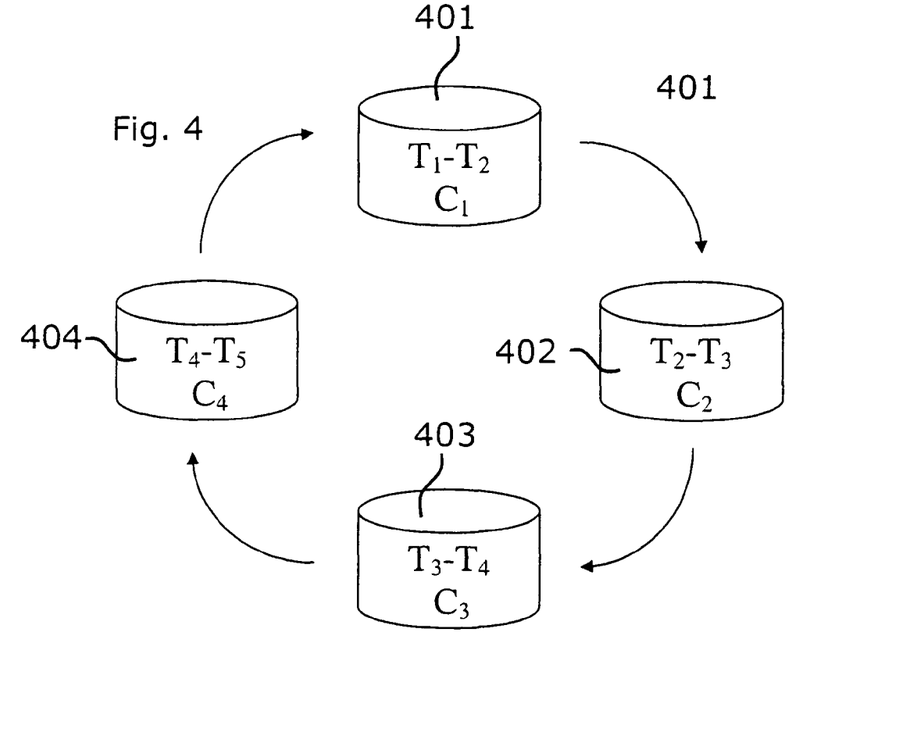
FIG. 4 illustrates memories used for storing trade parameter values.

FIG. 4 illustrates a first memory 401, a second memory 402, a third memory 403, and a fourth memory 404, constituting an example memory loop/set of memories. Each memory comprises a trade parameter value, $C_1$, $C_2$, $C_3$ and $C_4$, for storing an accumulated trade parameter value. Each memory is active during a time limit defined by the time limits: $T_1$-$T_2$, $T_2$-$T_3$, $T_3$-$T_4$ and $T_4$-$T_5$. By being active the memory is accessible for storing data such as trade parameter values. In this example embodiment, when the time period $T_4$-$T_5$, is finished the system continues to the first memory being active during the time period $T_1$-$T_2$.

The memories may be referred to as "time buckets" which describes how the memories or memory allocations are being used. Thus a time bucket can be a physical memory or a part of a memory (memory allocation). It is also possible to have time buckets on external memories. However, in this document, the terminology memory or memory allocation is used when referring to time buckets.

Figure 5:
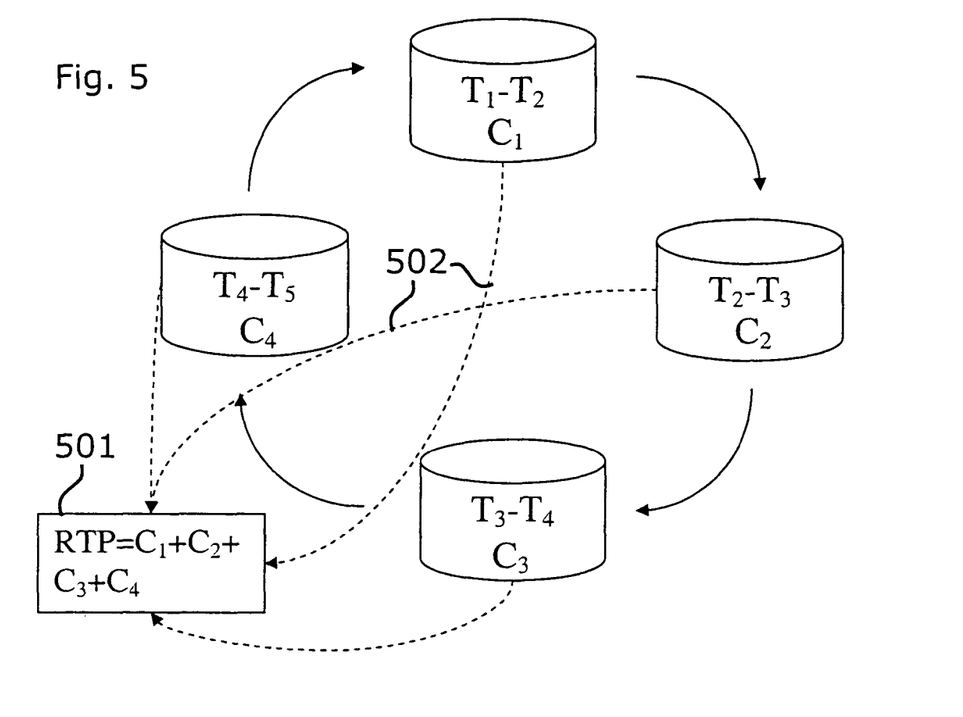
FIG. 5 illustrates memories and resent traded parameter (RTP) and how RTP may be calculated.

FIG. 5 illustrates the memories shown in FIG. 4 along with a recent trade parameter 501 (RTP). The dotted lines 502 illustrate how the trade parameter values may be added to the RTP at regular time intervals or at predetermined time intervals decided by a participant. Preferably an RTP is related to each memory loop comprising a plurality of memories so as to calculate RTP for each memory loop.

Figure 6:
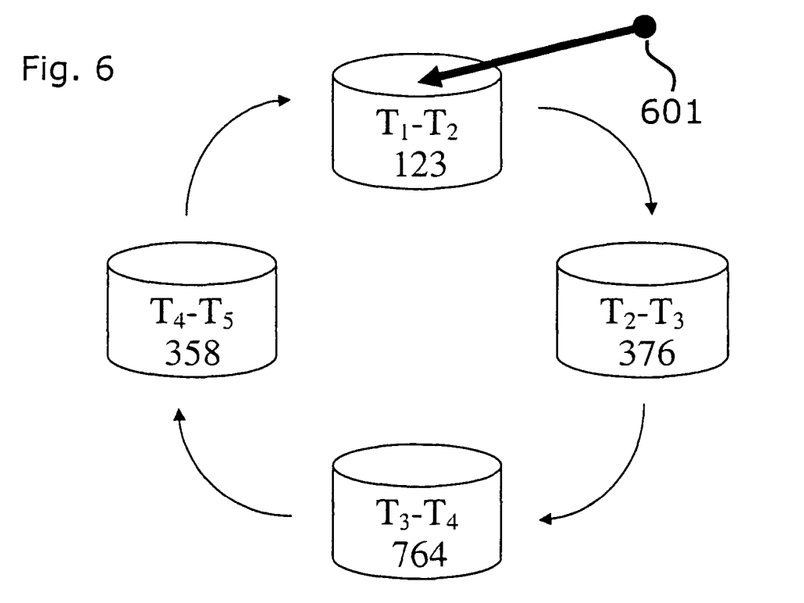
FIG. 6 illustrates the first step in the method for adding trade parameters to the memories.
Figure 7:
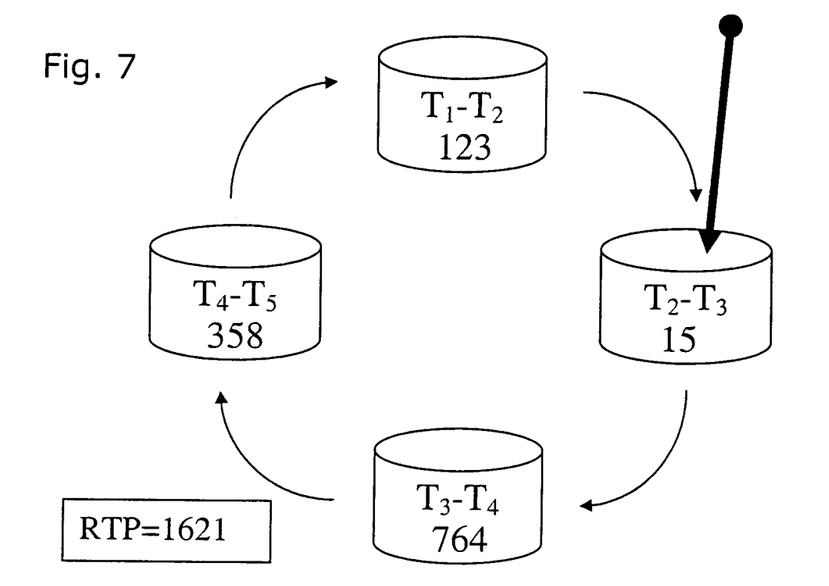
FIG. 7 illustrates the second step in the method for adding trade parameters to the memories.

FIG. 6 illustrates a situation wherein all memories or memory allocations have been used and currently the memory in the interval $T_1$-$T_2$ is activated as can be seen from the arrow 601 that represents which memory or memory allocation is activated. FIG. 6 is the first figure in a loop operation illustration. When the interval $T_1$-$T_2$ is finished, the memory $T_2$-$T_3$ is activated, as can be seen in FIG. 7. The trade parameter value in the memory may be set to 0; however, a preferred solution is to overwrite the old trade parameter value when a trade occurs in the interval $T_2$-$T_3$ to avoid unnecessary steps and save system resources.

For example if trade volume is to be measured and the first trade has a volume of 15, the trade parameter value in the memory $T_2$-$T_3$ is overwritten with 15 as shown in FIG. 7. The Recent Trade Parameter (RTP) shown in FIG. 7 is calculated before the memory $T_2$-$T_3$ is overwritten with 15, hence RTP=1621.

Figure 8:
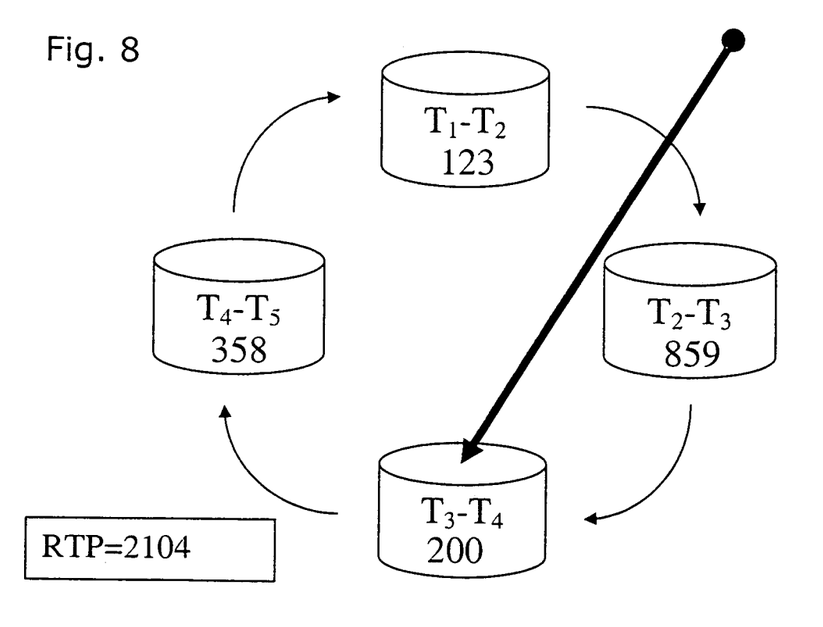
FIG. 8 illustrates the third step in the method for adding trade parameters to the memories.

A next step can be seen in FIG. 8 where the next memory in turn is activated for recording trade parameter values. Again the memory is overwritten when the first trade occurs in the time interval $T_3$-$T_4$. In this case the volume in the first trade is 200. Thus, 200 is added to the memory or memory allocation active during $T_3$-$T_4$. A new RTP may be calculated anytime and is not restricted to the time intervals start and end times.

Figure 9:
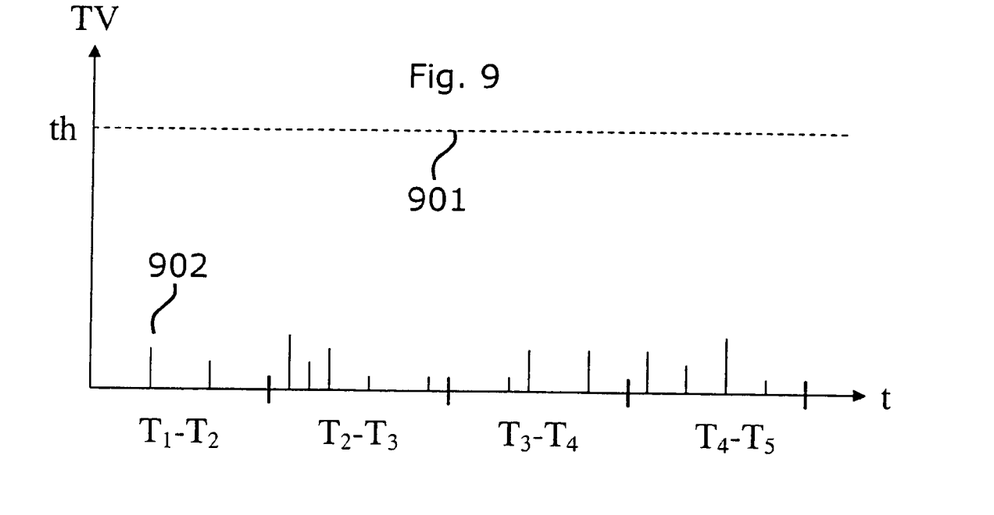
FIG. 9 illustrates trade volume (TV) over time and a threshold value (th)
Figure 10:
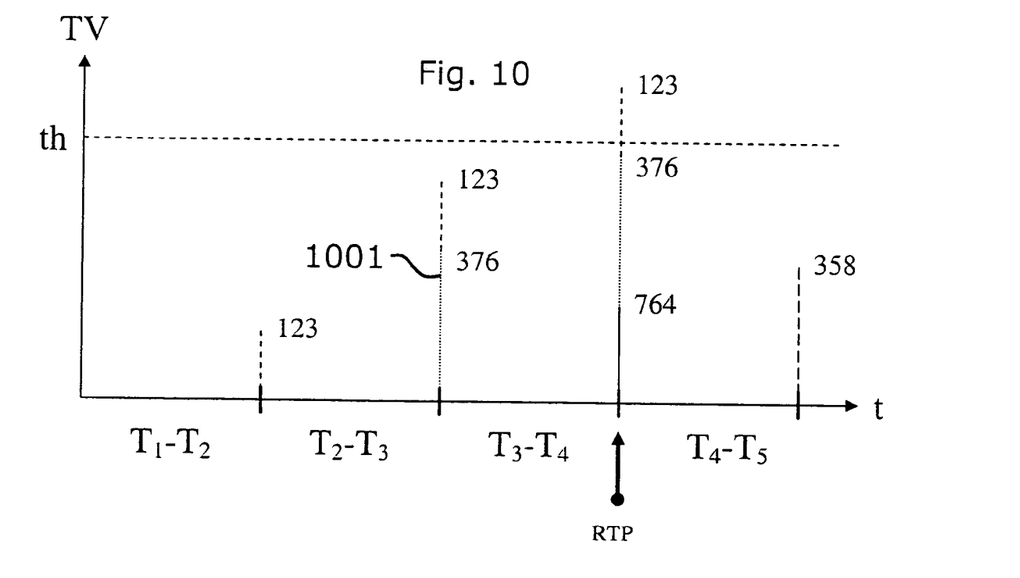
FIG. 10 illustrates aggregated trade volume (RTV) and when the RTV is greater than the threshold value.

FIG. 9 illustrates trades and their trade volume (TV) 902 over time for one or a set of securities. In the figure the time intervals $T_1$-$T_2$ to $T_4$-$T_5$ is illustrated on the x-axis. A threshold value (th) 901 is also shown in the figure. The trade volume is added and calculated after each time period RTP as shown in FIG. 10. This figure shows the RTP 1001 which is calculated by adding the trade parameter value from each memory. As shown in the figure RTP passes the threshold after the time interval $T_3$-$T_4$ which means that the system executes a monitoring action at this point.

When the system should execute a monitoring action may be decided/set by a participant or by the electronic exchange. The monitoring action may be executed before the actual trade is made. Thus, if there are matches which would lead to the trade volume exceeding the threshold, the monitoring action is executed before the actual trade takes place. Another solution is to let the actual trade take place and thereafter execute the monitoring action.

When to execute a monitoring action may depend on the situation or context, the participant/participants who may be affected by the monitoring action, how risk willing they are, credit worthiness, and so forth.

In order to obtain better resolution, the RTP may be calculated as often as necessary. For example, the RTP could be calculated X number of times within each time interval. X could be any number and is preferably chosen based on specific situation Preferably, the RTP is calculated whenever an accumulated trade parameter value has been updated.

Figure 11:
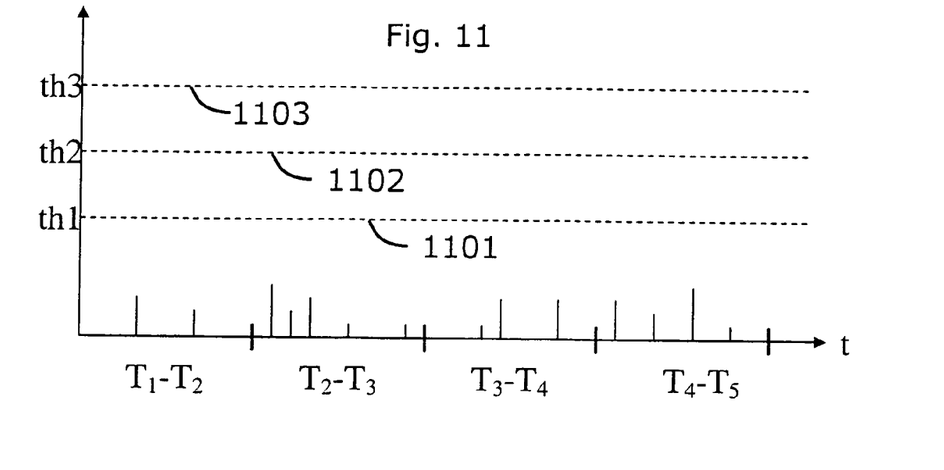
FIG. 11 illustrates trade volume (TV) over time and a plurality of threshold values.

FIG. 11 illustrates an example embodiment wherein three thresholds are used 1101 (th1), 1102 (th2) and 1103 (th3). The system may execute different monitoring action when the RTP reaches each threshold. For example, a notification action may be executed on the threshold 1101, a widening action may be executed on threshold 1102, and a canceling action may be executed on threshold 1103.

Figure 12:
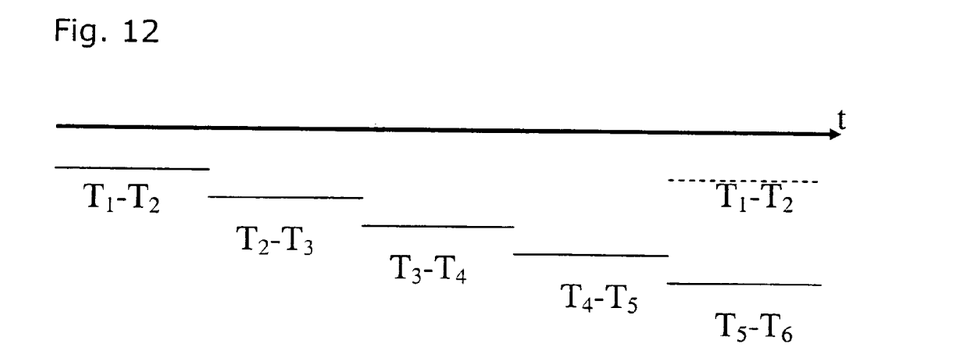
FIG. 12 illustrates an example of time intervals for the memories.

FIG. 12 illustrates how the time intervals may be located in time after each other. If only four intervals are used the time interval $T_5$-$T_6$ corresponds to time interval $T_1$-$T_2$, as illustrated by the dotted line.

Figure 13:
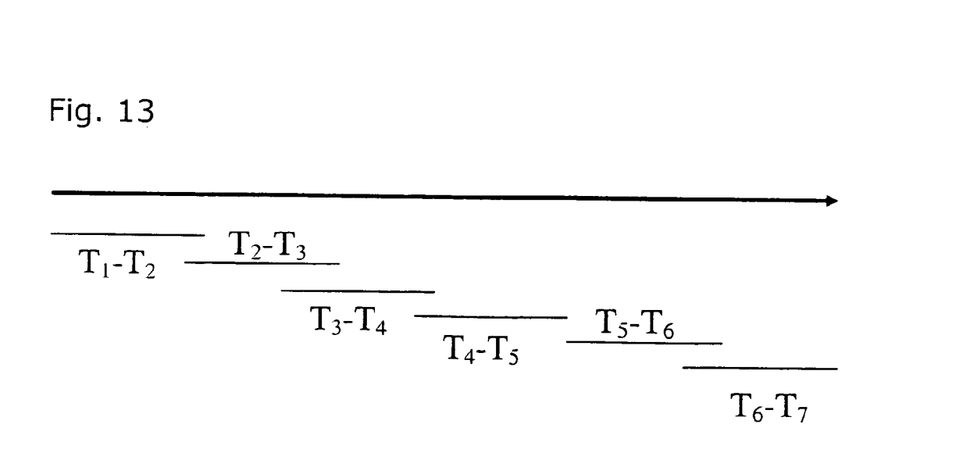
FIG. 13 illustrates an example of overlapping time intervals for the memories.

FIG. 13 illustrates an example embodiment wherein the time intervals are at least partly overlapping each other.

Figure 14:
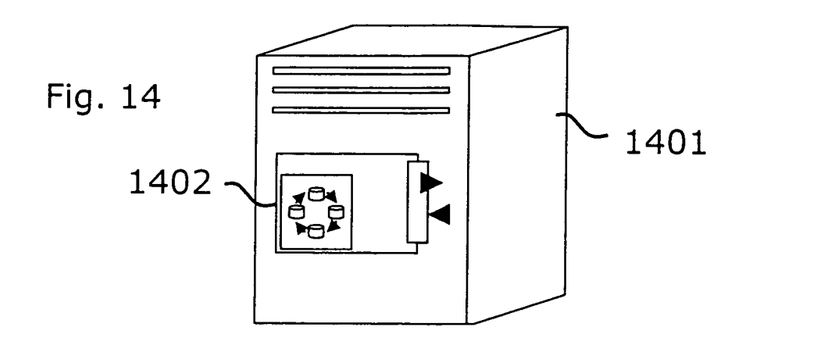
FIG. 14 illustrates a network device comprising a monitoring system.

FIG. 14 illustrates a network device 1401 such as a router, gateway, server comprising a monitoring module 1402. The network device may be located outside the electronic exchange for example at the client site. However, preferably the network device is as close to the electronic exchange as possible/practical.

Figure 15:
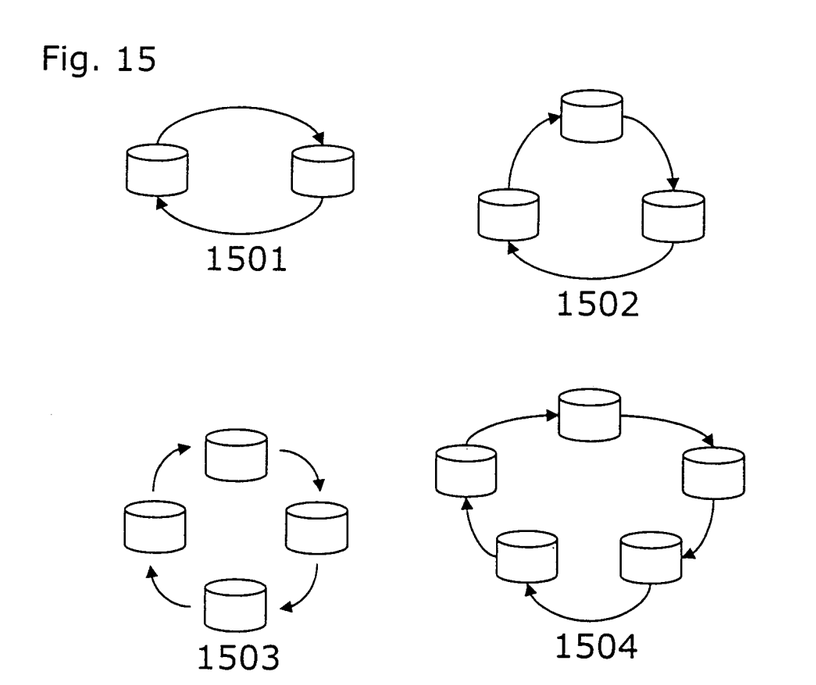
FIG. 15 illustrates examples of different number of memories.

FIG. 15 illustrates four different example embodiments of memories or memory allocations: a first embodiment with two memories 1501, a second embodiment with three memories 1502, a third embodiment with four memories 1503 and a fourth embodiment with five memories 1504. This is a figurative representation of the memories or memory allocations. In further example embodiments more memories can be used, and no upper limit exists. How many memories to use is dependent on the situation. In one situation, 10 memories may be used, but in another situation where a higher accuracy is needed 100 memories/memory allocations may be used.

Figure 16:
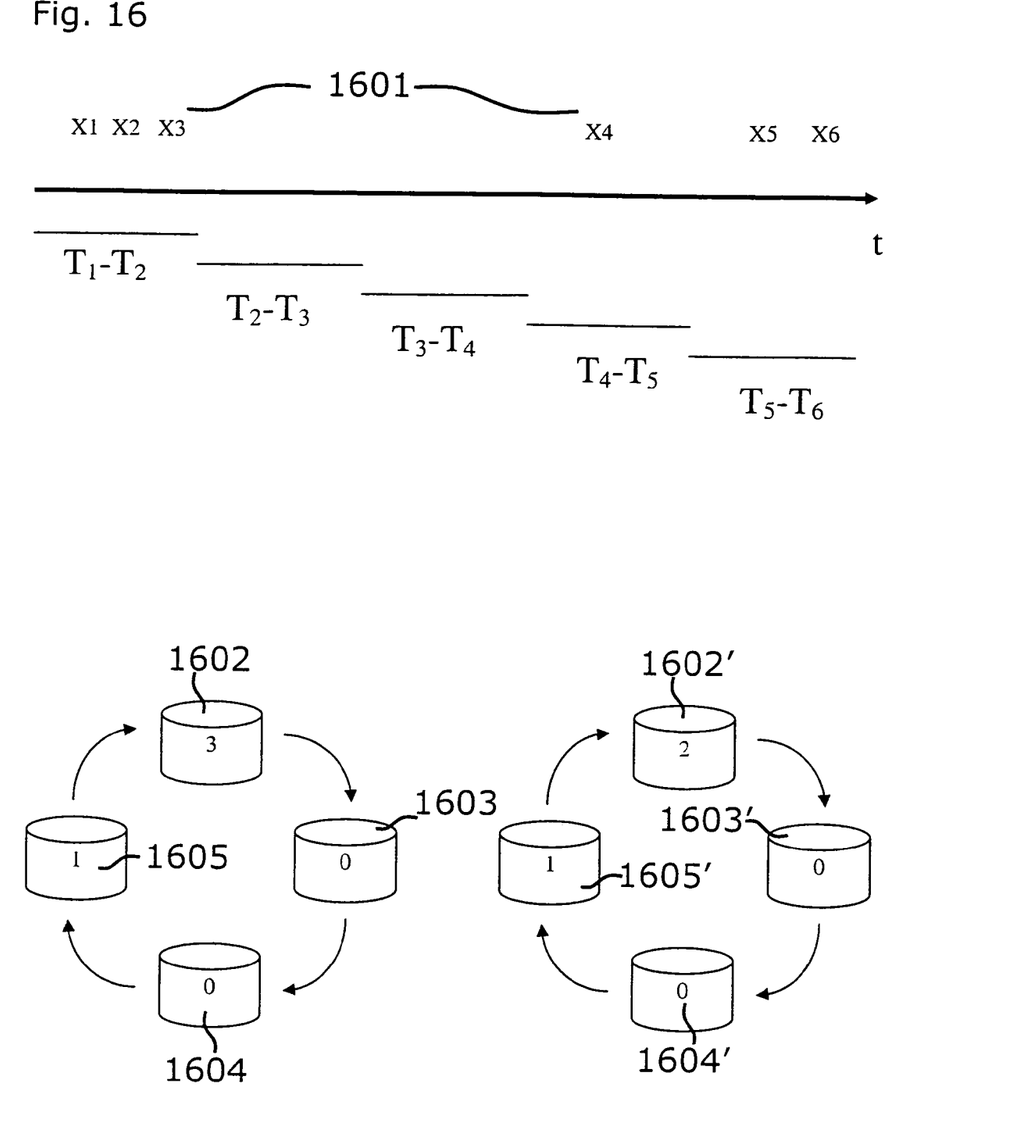
FIG. 16 illustrates an example wherein the connection between time periods and time buckets is shown.

FIG. 16 illustrates trades (X1-X6) 1601 over time t, wherein three trades (X1, X2, X3) occurs occur in the first time interval $T_1$-$T_2$, no trade in the second or third time interval, one trade (X4) in the fourth time interval $T_4$-$T_5$ and two trades (X5, X6) in the fifth time interval $T_5$-$T_6$. Each time interval is connected to a memory allocation 1602, 1603, 1604, 1605. There are only four memories, and therefore, the trades that occur in the time interval $T_5$-$T_6$ are saved in the same memory as the trades that occurred in the first time interval $T_1$-$T_2$. Hence the figure illustrates a loop of four memories.

The system preferably only accesses memories when a trade occurs. Hence as can be seen in the FIG. 16, trades occur in the first time interval and in the fourth time interval. Thus the system adds the three trades to the first memory but then it does not access any of the memories until the trade occurs in the fourth time interval, at this time the memories associated with the second and third time interval receives the value 0. Therefore it may be necessary to save definition start time for each memory so that the system can decide if earlier trades have occurred or not in a time interval. In this way unnecessary steps can be avoided.

Figure 17:
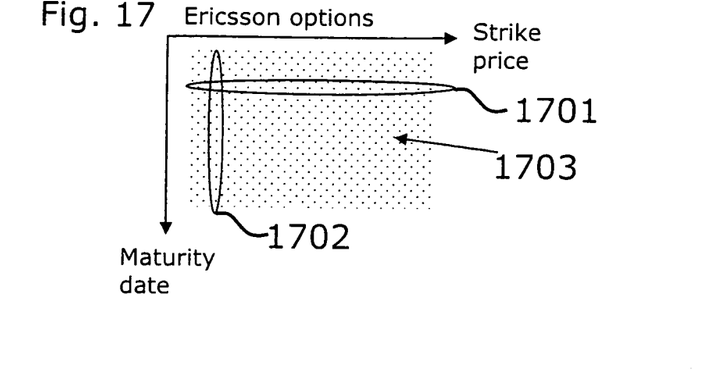
FIG. 17 illustrates series for Ericsson options having different strike price and maturity date.

FIG. 17 illustrates an example of a plurality of option series for Ericsson options having a strike price and maturity date. Each dot 1703 is a series for an option. The dots in the same column in the ellipse 1701 represents options series with the same Maturity date and dots in the same row in the ellipse 1702 illustrates options series with the same strike price.

Figure 18:
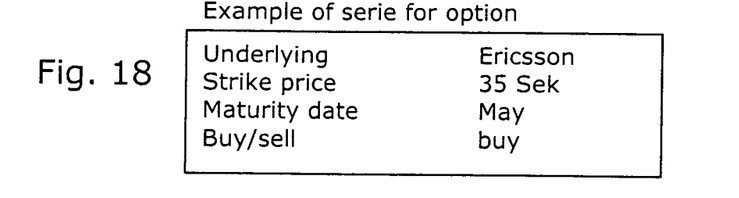
FIG. 18 illustrates data for a series for an Ericsson option.

FIG. 18 illustrates a series for an option with the underlying stock Ericsson, a strike price at 35 Sek, maturity date in May and that it is a buy option.

Figure 19:
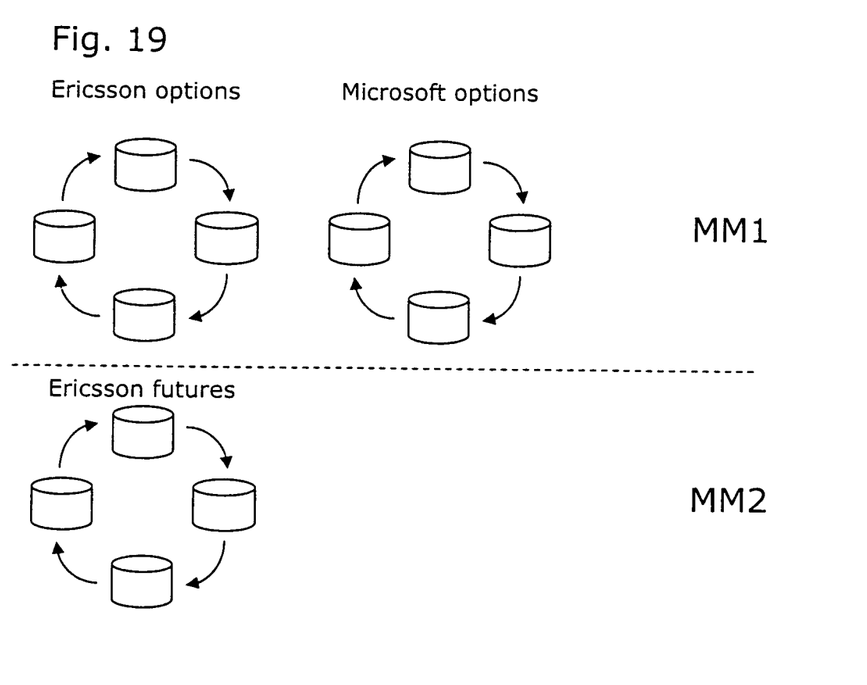
FIG. 19 illustrates that participants MM1 and MM2 may have different time bucket loops for different securities. The loops may comprise a different number of time buckets.

FIG. 19 is an illustration of two Market Makers MM1 and MM2 each having a memory loop for each security they are trading in. Thus MM1 has a memory loop for Ericsson Options and for Microsoft options, whereas MM2 only has a memory loop for Ericsson futures. Thus one participant may have a monitoring system comprising a specific memory loop for each security they are trading in. It would also be possible to have a memory loop for a combination of securities such as a memory loop for monitoring trades both for Ericsson options and Microsoft options, or a combination of stocks and options and so forth. Combinations of securities to be monitored in the same memory loop could be securities related to the same industry sector, securities related to the same country and so forth. The technology also applies to trading energy contracts, oil and other commodities as well as ordering systems and online gaming systems where individuals are the participants.

In the above description the term "comprising" does not exclude other elements or steps and "a" or "an" does not exclude a plurality. Furthermore the terms "include" and "contain" does not exclude other elements or steps.

The invention claimed is:

1. A computer system for monitoring matching of orders to buy or sell securities between participants, the matching of orders being communicated in trade messages that relate to securities trading, the trade messages comprising trade parameter data, the computer system comprising:
a hardware interface for receiving trade messages,
a computer-implemented extractor arranged to communicate with the interface to receive a trade message, and then extract a trade parameter value based on the trade parameter data of the trade message,
a number of multiple memories that are each computer-readable and computer-writeable,
a computer-implemented write unit arranged to communicate with the memories and the computer-implemented extractor for cyclically and sequentially addressing the memories one memory at a time for accumulating trade parameter values extracted during a start time and a stop time for each memory,
a computer-implemented read unit arranged to communicate with the memories for reading accumulated trade parameter values from the memories, and
a computer-implemented determiner arranged to communicate with the read unit for determining a recent trade parameter by utilizing the accumulated trade parameter value(s) read from the memories,
wherein the computer system is arranged to decrease risk exposure to price changes of one or more securities being traded by at least one of the participants based on the recent trade parameter.

2. The computer system in claim 1, wherein the number of memories includes a loop of three or more memories and the computer system is arranged to calculate the recent trade parameter for each memory loop based on the accumulated trade parameter value(s) stored in each memory in the loop.

3. The computer system in claim 2, wherein when each memory is addressed in the cycle, a new trade parameter value is stored in place of an old trade parameter value stored in the memory during the previous start and stop time.

4. A computer system for monitoring matching of securities orders between participants to buy or sell securities, the matching of securities orders is communicated in trade messages, the trade messages including securities trade parameter data, the computer system comprising:
a first memory that is computer-readable and computer-writeable for storing securities trade parameter values from a first start time to a first end time,
a second memory that is computer-readable and computer-writeable for storing securities trade parameter values from a second start time to a second end time, the second start time occurring later than the first start time and the second end time occurring later than the first end time,
a hardware interface for receiving the trade messages,
a processor programmed to:
upon receiving a trade message via the interface, determine a securities trade parameter value based on the securities trade parameter data in the trade message,
cyclically and sequentially address the first and second memories one memory at a time;
add the trade parameter value to an addressed one of the memories to create an accumulated securities trade parameter value for the addressed memory, and
determine a recent securities trade parameter by utilizing the accumulated securities trade parameter value from at least one of the first memory and second memory,
monitor matching of securities orders using the recent securities trade parameter to decrease risk exposure for a trading participant to price changes of securities being traded.

5. A computer system according to claim 4, the processor being programmed to:
upon a first securities trade message in a time interval overwrite an old accumulated securities trade parameter value in the memory by adding the securities trade parameter value,
sequentially adding the securities trade parameter value to the memory being accessible.

6. A computer system according to claim 4, further comprising an evaluator, the evaluator being programmed to:
evaluate the recent securities trade parameter in view of a threshold value using an operator, and
if the recent securities trading parameter fulfills a criterion based on the evaluation, execute a monitoring action.

7. A computer system according to claim 6, wherein the monitoring action is a securities order canceling action related to a specific participant.

8. A computer system according to claim 6, comprising a plurality of threshold values, the processor further being programmed to perform a specific monitoring action when the recent securities trading parameter exceeds each threshold value.

9. A computer system according to claim 6, wherein the monitoring action is a canceling action, the canceling action being executable by either deleting the orders or by inactivating the orders.

10. A computer system according to claim 4, wherein the second start time occurs simultaneously with the first end time.

11. A computer system according to claim 4, wherein the time between the first start time and first end time is less than 30 seconds.

12. A computer system according to claim 4, wherein the time between the second start time and second end time is less than 30 seconds.

13. A computer system according to claim 4, comprising 2 to n memories that are computer-readable and computer-writeable, each memory being accessible for storing from a start time and an end time, wherein the n:th start time occurs after the (n−1)th start time and n:th end time ends after (n−1)th end time.

14. A computer system according to claim 4, the processor further being programmed to access the first and second memories when a trade occurs.

15. A computer system according to claim 4, the processor further being programmed to accumulate a recent securities trade parameter from an individual or group of securities for an individual or a group of participants.

16. The computer system in claim 4, wherein the number of memories includes a loop of three or more memories and the computer system is arranged to calculate the recent trade parameter for each memory loop based on the accumulated trade parameter value(s) stored in each memory in the loop.

17. The computer system in claim 16, wherein when each memory is addressed in the cycle, a new trade parameter value is stored in place of an old trade parameter value stored in the memory during the previous start and stop time.

18. A network device comprising a computer system according to claim 1.

19. A computer-implemented electronic exchange system, comprising:
a market place comprising an electronically readable and writeable orderbook memory for storing a record of security trade orders to buy or sell securities,
matching circuitry for matching of security trade orders,
an electronically readable and writeable member database,
a computer-implemented information dissemination module for distributing information to members associated to the electronic exchange, and
a computer-implemented trade monitoring module for monitoring matching of orders in the electronic exchange,
the matching of orders is communicated in trade messages, the trade messages comprising trade parameter data, the computer-implemented trade monitoring module comprising:
an interface for receiving trade messages relating to securities trading,
a computer-implemented extractor arranged to communicate with the interface to receive a trade message and then to extract a trade parameter value based on the trade parameter data of the trade message,
a number of multiple memories that are computer-readable and computer-writeable associated with the computer-implemented extractor,
a computer-implemented write unit arranged to communicate with the memories for cyclically and sequentially accessing the memories one memory at a time for accumulating extracted trade parameter values during a start time and a stop time for each memory,
a computer-implemented read unit arranged to communicate with the memories for reading accumulated trade parameter values from the memories, and
a computer-implemented determiner arranged to communicate with the read unit for determining a recent trade parameter by utilizing the accumulated trade parameter values read from the memories,
wherein the computer-implemented trade monitoring module is arranged to decrease risk exposure to price changes of one or more securities being traded by at least one of the participants based on the recent trade parameter.

20. The electronic exchange in claim 19, wherein the number of memories includes a loop of three or more memories and the computer system is arranged to calculate the recent trade parameter for each memory loop based on the accumulated trade parameter value(s) stored in each memory in the loop.

21. The electronic exchange in claim 20, wherein when each memory is addressed in the cycle, a new trade parameter value is stored in place of an old trade parameter value stored in the memory during the previous start and stop time.

22. A computerized method for monitoring matching of orders to buy or sell securities in an electronic exchange, between different participants, the matching of securities orders is communicated in trade messages, the trade messages including securities trade parameter data, the exchange including a first memory that is computer-readable and computer-writeable for storing securities trade parameter values from a first start time to a first end time, a second memory that is computer-readable and computer-writeable for storing securities trade parameter values from a second start time to a second end time, the second start time occurring later than the first start time and the second end time occurring later than the first end time, and a hardware interface for receiving the trade messages, the computerized method comprising the steps of:
upon receiving a trade message via the interface, electronically determining a securities trade parameter value on a processor based on the securities trade parameter data in the trade message,
the processor electronically cyclically and sequentially addressing the first and second memories one memory at a time;
the processor electronically adding the securities trade parameter value to one or both of the addressed memories, thereby creating an accumulated securities trade parameter value, and
the processor electronically determining a recent securities trade parameter by utilizing the accumulated securities trade parameter value from at least one of the first memory and second memory,
the processor electronically monitoring matching of securities orders using the recent securities trade parameter to decrease risk exposure for a trading participant to price changes of securities being traded.

23. A method according to claim 22, the method further comprising the computerized steps of:
the processor electronically evaluating the recent securities trade parameter in view of a threshold value using an operator, and
if the recent securities trading parameter fulfills a criterion based on the evaluation, the processor electronically executing a monitoring action.

24. A method according to claim 23, wherein the monitoring action includes canceling matching of orders related to a specific participant.

25. A method according to claim 23, wherein the monitoring action includes a canceling action, the method further comprising the processor electronically executing the canceling action by either deleting the orders or by inactivating the orders.

26. The computerized method in claim 22, wherein the exchange includes a loop of three or more memories and the method further comprises calculating the recent trade parameter for each memory loop based on the accumulated trade parameter value(s) stored in each memory in the loop.

27. The computerized method in claim 26, wherein when each memory is addressed in the cycle, a new trade parameter value is stored in place of an old trade parameter value stored in the memory during the previous start and stop time.

28. A computerized method for monitoring matching of orders to buy or sell securities between participants in an electronic exchange comprising an interface, a number of multiple memories that are electronically readable and writeable by a processor, the matching of orders being communicated in trade messages relating to securities trading, the trade messages comprise trade parameter data, the method comprising the steps of:

the processor electronically extracting a trade parameter value based on the trade parameter data of the trade message, the processor electronically cyclically and sequentially addressing the memories one at a time for accumulating extracted trade parameter values during a start time and a stop time for each memory, the processor electronically reading accumulated trade parameter values from the memories, the processor electronically determining a recent trade parameter by utilizing the accumulated trade parameter values read from the memories, and the processor electronically decreasing risk exposure to price changes of one or more securities being traded by at least one of the participants based on the recent trade parameter.

29. The computerized method in claim 28, wherein the exchange includes a loop of three or more memories and the method further comprises calculating the recent trade parameter for each memory loop based on the accumulated trade parameter value(s) stored in each memory in the loop.

30. The computerized method in claim 29, wherein when each memory is addressed in the cycle, a new trade parameter value is stored in place of an old trade parameter value stored in the memory during the previous start and stop time.

31. A memory or storage medium having program instructions for carrying out the steps of the method as claimed in claim 19.

* * * * *